US010938763B2

(12) United States Patent
Ganesh et al.

(10) Patent No.: US 10,938,763 B2
(45) Date of Patent: Mar. 2, 2021

(54) SYSTEMS AND RELATED METHODS FOR ASSOCIATING PERSONAL MESSAGES WITH PARCELS

(71) Applicant: United Parcel Service of America, Inc., Atlanta, GA (US)

(72) Inventors: Bala Ganesh, Alpharetta, GA (US); Scott Castaldo, Woodstock, GA (US); Amber Sappington, Atlanta, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 490 days.

(21) Appl. No.: 14/195,332

(22) Filed: Mar. 3, 2014

(65) Prior Publication Data

US 2014/0258424 A1      Sep. 11, 2014

Related U.S. Application Data

(60) Provisional application No. 61/773,579, filed on Mar. 6, 2013.

(51) Int. Cl.
*H04L 12/58* (2006.01)
*G06Q 10/08* (2012.01)

(52) U.S. Cl.
CPC ......... *H04L 51/18* (2013.01); *G06Q 10/0833* (2013.01)

(58) Field of Classification Search
CPC ............................ H04L 51/18; G06Q 10/0833
See application file for complete search history.

(56) References Cited

U.S. PATENT DOCUMENTS

| 6,321,211 | B1 | 11/2001 | Dodd | |
| 8,046,266 | B1 | 10/2011 | Geller et al. | |
| 8,353,448 | B1 | 1/2013 | Miller et al. | |
| 8,413,882 | B1* | 4/2013 | Nidamarthi | G06Q 10/00 235/375 |
| 2006/0195364 | A1* | 8/2006 | Shroff | G06Q 10/083 705/26.3 |
| 2009/0281929 | A1* | 11/2009 | Boitet | G06Q 10/08 705/28 |

(Continued)

OTHER PUBLICATIONS

PCT International Search Report, dated Nov. 25, 2014, from corresponding International Application Serial No. PCT/US2014/021354.

(Continued)

*Primary Examiner* — Abdulkader M Alriyashi
(74) *Attorney, Agent, or Firm* — Shook, Hardy & Bacon L.L.P.

(57) ABSTRACT

A system and method for allowing a purchaser of a gift to associate a personal message (e.g., an audio and/or video message) with the gift is described. The personal message may be associated with the gift via a unique identifier associated with a parcel (e.g., a parcel tracking number) in which the gift is shipped to the intended recipient of the gift. Once the gift is received by the gift recipient, the gift recipient may also associate a message with the gift via the unique identifier. The gift recipient's message may be in response to the purchaser's message, an unrelated message to the purchaser, a message to the retailer where the gift was purchased, or a message to a common carrier.

12 Claims, 3 Drawing Sheets

(56) References Cited

U.S. PATENT DOCUMENTS

| | | | |
|---|---|---|---|
| 2010/0009703 A1* | 1/2010 | Sornay | H04L 51/32 |
| | | | 455/466 |
| 2010/0121764 A1 | 5/2010 | Niedermeyer | |
| 2012/0028660 A1* | 2/2012 | Stafford | H04W 4/12 |
| | | | 455/466 |
| 2012/0271697 A1 | 10/2012 | Gilman et al. | |
| 2013/0226728 A1* | 8/2013 | Oghittu | G06Q 30/0621 |
| | | | 705/26.5 |

OTHER PUBLICATIONS

Written Opinion of the International Searching Authority, dated Nov. 25, 2014, from corresponding International Application Serial No. PCT/US2014/021354.

\* cited by examiner

SYSTEMS AND RELATED METHODS FOR ASSOCIATING PERSONAL MESSAGES WITH PARCELS

CLAIM OF PRIORITY

This application claims the benefit of priority under 35 U.S.C. § 119(e) to the filing date of U.S. Provisional Patent Application No. 61/773,579, filed Mar. 6, 2013, entitled, "Messaging Systems and Related Methods," which is incorporated herein by reference in its entirety.

BACKGROUND

With the proliferation of the Internet, customers are able to conveniently order products and services from online retailers. In the context of gift giving, the increase in online gift purchases has led to a dramatic increase in the number of gifts that are shipped directly from an online retailer to the gift recipient. In such cases, the gift giver does not typically have the opportunity to attach a personalized note to the gift. While some online retailers allow the gift giver to provide text for use in a message that is included with their gift, this text is usually limited in the number of characters available, rendering the notes short and impersonal.

Various embodiments of the present system and methods recognize and address the foregoing limitations.

SUMMARY

According to various embodiments, a computer system for facilitating communication between a purchaser of a gift and a recipient of the gift includes at least one processor and is configured for: 1) receiving, from the gift purchaser, a first message that is associated with the gift and that the gift purchaser intends to send to the gift recipient; 2) using an identifier associated with the gift to associate, in computer memory, the first message with the gift; 3) receiving, from the gift recipient, a request to receive the first message that is based on the identifier; 4) in response to receiving the request, enabling the gift recipient to receive the first message; 5) receiving, from the gift recipient, a second message that is related to the gift; and 6) using the identifier to associate, in computer memory, the second message with the gift.

According to a particular embodiment, computer-implemented method of associating a message with a parcel used to ship an item to a parcel recipient includes: 1) receiving, from a parcel recipient, a first message and information associated with a parcel that was received from an item sender, wherein: i) the parcel was used to transport the item to the parcel recipient; and ii) the information is based on a unique identifier associated with the parcel; 2) storing, using a processor, the first message in memory; 3) notifying, using a processor, the item sender that the first message is available to receive; 4) receiving a request, from the item sender, to receive the first message; and 5) facilitating the item sender receiving the first message.

In general, in one or more embodiments, a non-transitory computer-readable medium stores computer executable instructions for: 1) receiving information by reading a machine-readable indicium associated with a parcel; 2) conveying the received information to a server; 3) at least partially in response to conveying the received information to the server, receiving a message associated with a message sender; and 4) playing the received message to a message recipient.

BRIEF DESCRIPTION OF THE DRAWINGS

Reference will now be made to the accompanying drawings, which are not necessarily drawn to scale, and wherein.

DETAILED DESCRIPTION OF VARIOUS EMBODIMENTS

Figure 1:
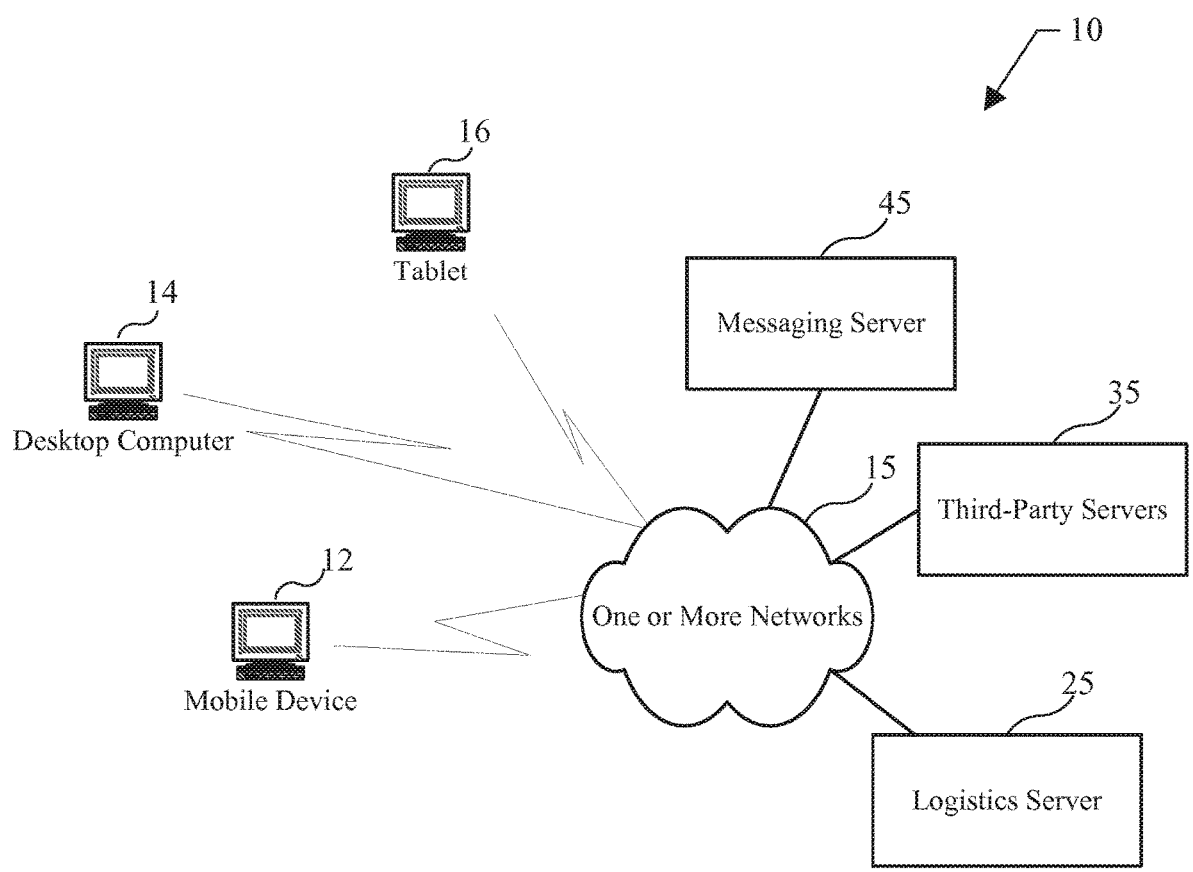
FIG. 1 shows a block diagram of a Messaging System according to one embodiment.

Various embodiments now will be described more fully hereinafter with reference to the accompanying drawings. It should be understood that the invention may be embodied in many different forms and should not be construed as limited to the embodiments set forth herein. Like numbers refer to like elements throughout.

System Overview

A computer system, in various embodiments, allows a purchaser of an item intended as a gift (e.g., a gift for a friend) to associate a personal message (e.g., an audio and/or video message) with the item before the item is sent to the item's intended recipient (e.g., the parcel recipient). In a particular embodiment, the system stores the item purchaser's recorded message in memory (e.g., a database) and associates the recorded message, within computer memory, with a unique identifier (e.g., a tracking number) associated with a parcel that will contain the gift. After the parcel recipient receives the parcel, the parcel recipient may send the parcel's unique identifier to the system (e.g., by scanning the barcode on the parcel) to retrieve and view the recorded message. According to various embodiments, the parcel recipient may then record a second message to be received by the item purchaser.

Item Purchaser Sends a Message to a Parcel Recipient

There are, for example, two common scenarios (and/or other scenarios) in which a purchaser may wish to associate a message with a parcel: (1) the purchaser purchases an item from a brick and mortar retailer or an online retailer and ships the related parcel to the parcel recipient themselves; or (2) the purchaser purchases an item from an online retailer and the gift is packaged and sent directly to the parcel recipient by the online retailer.

A Purchaser Sends a Purchased Item

In the first scenario, the item purchaser may use a logistics company to ship a parcel (e.g., containing the item) to the intended recipient (e.g., the parcel recipient). In order to track the parcel through the shipping process (e.g. as the parcel travels from the item purchaser to the parcel recipient), the logistics company may use a shipping label that is attached to the parcel and has at least one barcode (e.g., a unique identifier) printed on it. A logistics server, which is part of a logistics system, may use the barcode to route and track the parcel based, at least partially on information that the item purchaser (e.g., the parcel sender) enters into the logistics system (e.g., a ship-to address).

As noted above, the logistics system may be adapted, in various embodiments, to allow the parcel sender to record a message to the parcel recipient and to associate the message with the parcel via a barcode on the parcel's shipping label. In a particular example, the logistics system may be configured to allow the parcel sender to use an application running on a mobile computing device (e.g., a handheld device) to record an audio or video message and to associate the recorded message with the parcel. In various embodiments, the application may be configured to request that the parcel sender enter the tracking number (e.g., unique identifier and/or barcode on the parcel) associated with the parcel. The parcel sender may enter the tracking number using a keyboard associated with the mobile computing device or by scanning the barcode using the camera associated with the mobile computing device. The application may then capture the parcel sender's message (e.g., using the mobile computing device's keyboard or camera), which it uploads with the parcel tracking information (e.g., unique identifier) to the logistics server. The logistics server may, in a particular embodiment, save the message and tracking information on the logistics server, on a separate message server, or may facilitate the upload of the message to a third-party server (e.g., a web service server). In various embodiments, the logistics server may be configured to post the message to a social networking site that is hosted by a third-party server.

A Retailer Sends a Purchased Item

In the second scenario, the purchaser may purchase an item from an online or brick and mortar retailer. Instead of delivering the item to the item purchaser, the online retailer (the "parcel sender") may ship the gift directly to the parcel recipient. In this case, the online retailer may facilitate capturing a message from the item purchaser at the time the online purchase is made (e.g., during and/or shortly after the checkout process). In various embodiments, the online retailer may enable the item purchaser to capture the message and store the message on one of its servers (e.g., a third-party server). When the online retailer is ready to ship the gift (e.g., parcel) to the parcel recipient, the online retailer may associate the parcel with the stored message using one or more unique identifiers (e.g., the tracking number on a shipping label used to ship the item). In various embodiments, the parcel may be shipped using a logistics company or by any other suitable shipping company.

In further embodiments, the online retailer may partner with a logistics company to associate messages with items that are purchased and being sent to an item recipient as a gift. In this example, the online retailer's website may be configured to integrate with the logistics company's computer system to allow the purchaser of a gift (the "item purchaser") to record a message to the parcel recipient (e.g., the gift recipient) and store the message with the online retailer. As such, the online retailer's checkout procedure may include a step in which the item purchaser logs in to an account (e.g., their MyChoice™ account) that they have with the logistics company. The checkout process may then include a step where the message intended for the parcel recipient is captured and associated with the online purchase so that it can later be associated with a shipped parcel that contains the gift. In various embodiments, the message may be stored on the retailer's server (e.g., a third-party server) and linked to the item purchaser's account. When the item is shipped to the parcel recipient, the system may then associate the message with the parcel used to ship the item using a unique identifier (e.g., a parcel tracking number) associated with the parcel. The message may remain on the online retailer's server or may be uploaded to a logistics server (e.g., which may be associated with a logistics company). In other embodiments, the message may be uploaded directly to the logistics server when it is captured and later associated with the parcel when shipping of the item is arranged by the online retailer. In still other embodiments, the message may be uploaded to a social networking website.

Upon receipt of the parcel by the parcel recipient, the parcel recipient may use a mobile computing device and related application to retrieve the message. In a particular example, the gift recipient may use a mobile device to scan a barcode representing the tracking number on the shipping label of the parcel. The mobile device may include an application that is configured to then use the tracking number, or information associated with the tracking number, to retrieve the message. In some embodiments, the message may be played directly by the application or another message player on the mobile computing device. In further embodiments, the logistics server or the online retail server may send the gift recipient an email or text message that includes a link to the video message. The link, when activated, may then play the message in a browser or other application on the mobile computing device or on another computer.

Parcel Recipient Sends a Message

In various embodiments, the parcel recipient may send a second message. This second message may be in response to receiving the first message (e.g., from the item purchaser as described above) and/or the second message may be intended for a third party, such as a retailer or manufacturer, to show the condition of the one or more items (e.g., if the one or more items arrived damaged, defective, etc.) received by the parcel recipient.

A Parcel Recipient Sends a Message to the Item Purchaser

In certain embodiments, the parcel recipient may record a return video and/or audio message for later access by the item purchaser. The message may include, for example, video of the gift recipient opening the parcel and/or a thank you message. In particular embodiments, the system stores the item recipient's recorded message in memory and associates it with the parcel's unique identifier (e.g., tracking number) within the database. The item purchaser may access the message, for example, by typing the unique identifier into a webpage associated with the system or by logging into their account with the online retailer or the logistics company. In some embodiments, the system may communicate the message in any other suitable way, such as, for example: (1) by sending the item purchaser an email and/or text message that includes a selectable link (e.g., a URL) to the message; and/or (2) by posting the link to the item purchaser's account on a social networking website or other website.

A Parcel Recipient Sends a Message to a Third Party

In various other embodiments, the parcel recipient may capture a video of the received item to send to a third party. In a particular example, the parcel recipient (or other recipient of an item) may wish to capture a video to submit to the sender or retailer if the received item is damaged. Using the barcode and/or tracking number (or a separate unique identifier) on the shipping label, the recipient may upload a message to the logistics server or third-party server (e.g., the online retailer server) and select an option that notifies the logistics company that the parcel was delivered damaged. The logistics company may use the item recipient's message to evaluate the claim and view the condition of the parcel as delivered to determine if the recipient's claim is valid.

In another example, the parcel recipient may capture a video of the received item if the received item is not in working order or is the wrong item. In this example, the parcel recipient may select an option when uploading the message that notifies the online retailer of a problem with the item. In this embodiment, the message may either be directly uploaded to the third-party server (e.g., the online retailer's server) or the logistics server for review. Here, the online retailer may use the recipient's video message to view the item and determine how to resolve the recipient's claim.

Exemplary Technical Platforms

As will be appreciated by one skilled in the relevant field, the present invention may be, for example, embodied as a computer system, a method, or a computer program product. Accordingly, various embodiments may be entirely hardware, entirely software, or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized, including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, smart mobile device, or other programmable data processing apparatus to produce a machine. As such, the instructions which execute on the general purpose computer, special purpose computer, smart mobile device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Exemplary System Architecture

FIG. 1 shows a block diagram of a Messaging System 10 according to a particular embodiment of the present invention. As may be understood from this figure, the Messaging System 10 may include a Logistics Server 25, one or more Computer Networks 15, a Messaging Server 45, one or more Third-Party Servers 35 (e.g., a web hosting server, retailer's server, or any other server) and one or more of the following: a Tablet Computer 16; a Desktop Computer 14; and a Mobile Device 12 (e.g., a handheld computing device, a laptop, or any other mobile computing device).

The one or more Networks 15 facilitate communication between the Logistics Server 25, the Messaging Server 45, the one or more Third-Party Servers 35, the Tablet 16, the Desktop Computer 14, and the Mobile Device 12. These one or more Computer Networks 15 may include any of a variety of types of computer networks such as the Internet, a private intranet, a public switch telephone network (PSTN), WAN, LAN, or any other type of suitable network. In certain variations of the embodiment shown in FIG. 1, both the communication link between the Logistics Server 25, Third-Party Servers 35, Messaging Server 45, Tablet 16, Desktop Computer 14, and Mobile Device 12 are implemented via the Internet using Internet Protocol (IP).

It should be understood that the Servers 25, 35, and 45 do not necessarily need to be deployed over the network. For example, in various embodiments, it may be deployed locally on the user's computer, tablet, and/or mobile device.

Figure 2:
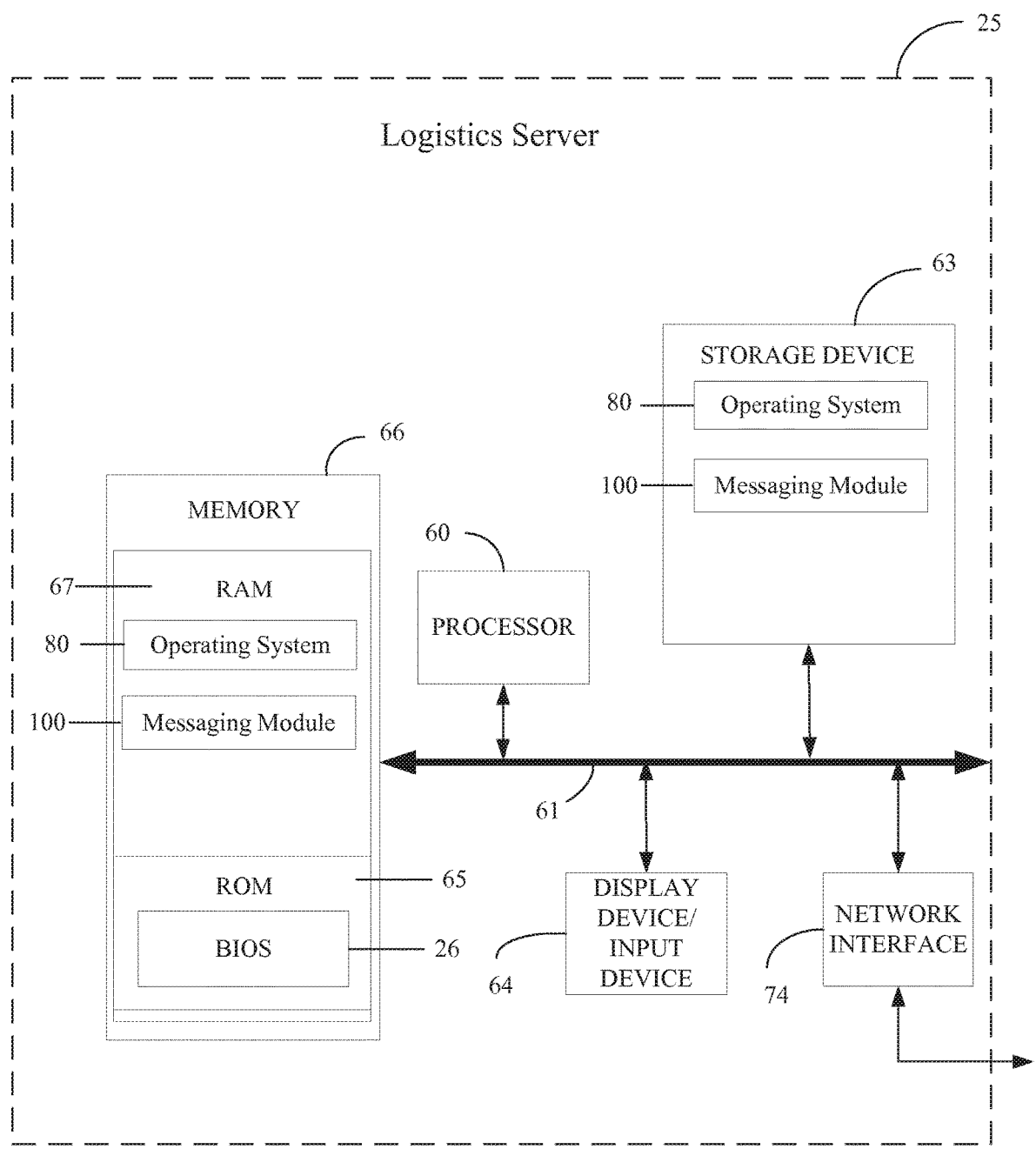
FIG. 2 shows a block diagram of the Logistics Server of FIG. 1.

FIG. 2 shows a block diagram of an exemplary embodiment of a computing device of FIG. 1 (e.g., the Logistics Server 25, the Third-Party Servers 35, the Message Server 45, a Tablet 16; a Desktop Computer 14; or a Mobile Device 12). Although FIG. 2 may represent any of the devices above, for purposes of clarity and brevity, the Logistics Server 25 will serve as an example for the description of FIG. 2.

The Logistics Server 25 may include a Processor 60 that communicates with other elements within the Logistics Server 25 via a System Interface or Bus 61. The Logistics Server 25 may also include a Display Device/Input Device 64 for receiving and displaying data. This Display Device/Input Device 64 may be, for example, a keyboard, a voice recognition device, or a pointing device that is used in combination with a monitor. The Logistics Server 25 may further include a Memory 66, which preferably includes both a Read Only Memory (ROM) 65 and a Random Access Memory (RAM) 67. The server's ROM 65 is used to store a Basic Input/Output System (BIOS) 26 that contains the basic routines that help to transfer information between elements within the Logistics Server 25.

Also located within the Logistics Server 25 may be a Network Interface 74 for interfacing and communicating with other elements of a computer network. It will be appreciated by one of ordinary skill in the art that one or more components of the Logistics Server 25 may be located geographically remote from other components of the Logistics Server 25. Furthermore, one or more of the components may be combined, and additional components performing functions described herein may be included in the Logistics Server 25.

The Logistics Server 25 may also include at least one Storage Device 63, such as a hard disk drive, a floppy disk drive, a CD Rom drive, or an optical disk drive, for storing information on various computer-readable media, such as a hard disk, a removable magnetic disk, or a CD-ROM disk. As will be appreciated by one of ordinary skill in the art, each of these Storage Devices 63 may be connected to the Bus 61 by an appropriate interface. The Storage Devices 63 and their associated computer-readable media may provide nonvolatile storage for the Logistics Server 25. It is important to note that the computer-readable media described above could be replaced by any other type of computer-readable media known in the art. Such media includes, for example, magnetic cassettes, flash memory cards, and digital video disks.

A number of program modules may be stored by the various storage devices and within the RAM 67. Such program modules include an Operating System 80 and a Messaging Module 300. For simplicity and brevity, the Messaging Module 300 is merely exemplary and may represent a number of program modules which control certain aspects of the operation of the Logistics Server 25 with the assistance of the Processor 60 and the Operating System 80. Exemplary embodiments of the Messaging Module 300 are described in more detail below.

Exemplary Messaging Module

Figure 3:
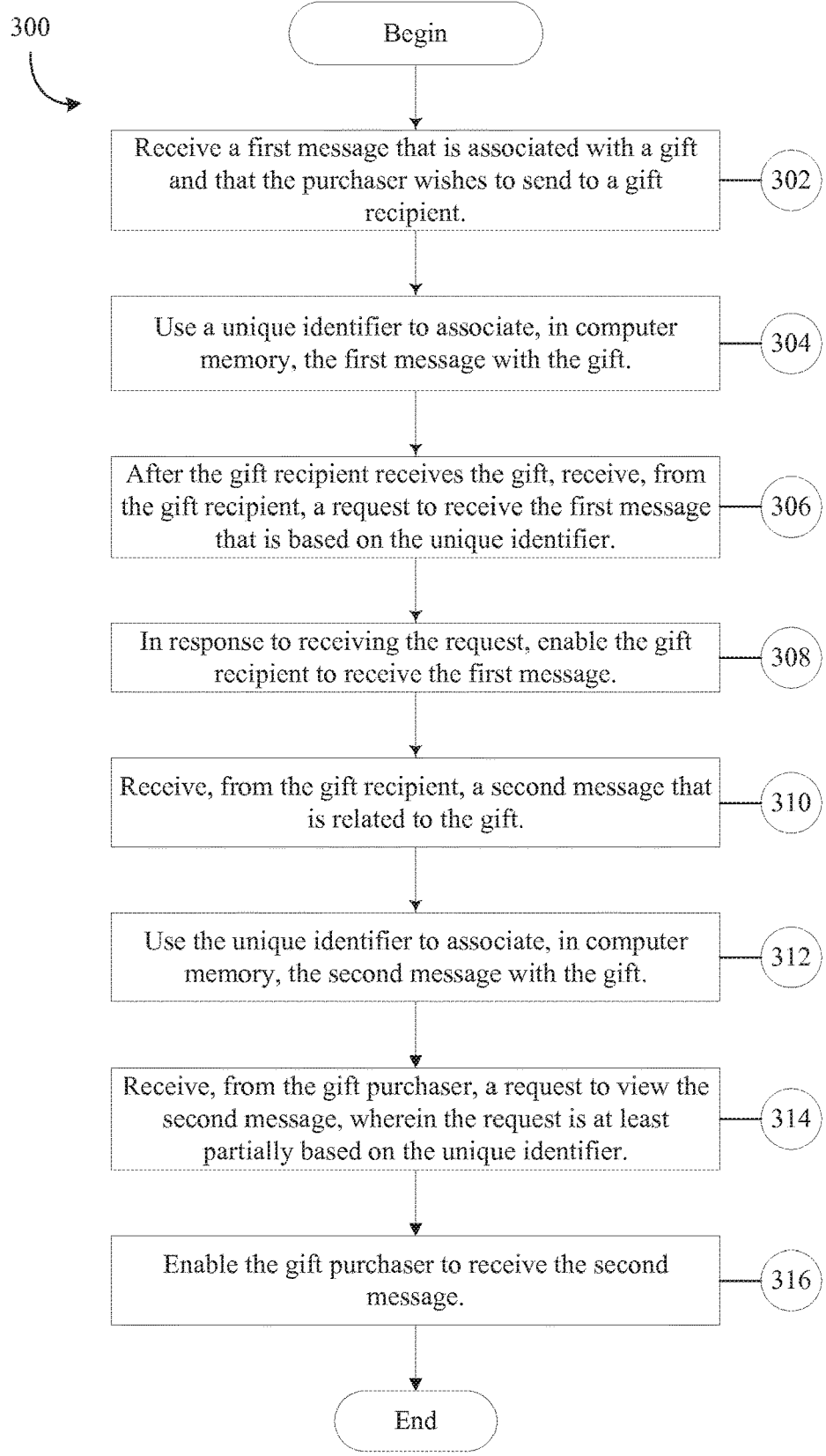
FIG. 3 shows a flow diagram that generally illustrates various steps executed by the exemplary Messaging Module of FIG. 2 in accordance with various embodiments of the system of FIG. 1.

The operation of certain embodiments of the Messaging Module 300 is shown in FIG. 3. The Devices 12, 14, 16 and the Servers 25, 35, 45 may alone, or in combination, perform the system and method steps of FIG. 3. In various embodiments, all system and method steps of FIG. 3 are performed alone by one of the Logistics Server 25 or the one or more Third-Party Servers 35, or in combination with each other and/or the Messaging Server 45. It should be understood by reference to this disclosure that these figures describe exemplary embodiments of the system and method steps carried out by the present system, and that other exemplary embodiments may be created by adding other steps or by removing one or more of the system and/or method steps shown in FIG. 3.

The embodiment of the Messaging Module 300 in FIG. 3 depicts an example in which the purchaser of one or more items (e.g., the item purchaser) purchases one or more items via an on online retailer, and the online retailer sends the item to the intended recipient (e.g., the parcel recipient). However, the Messaging Module 300 may be embodied in many forms and other exemplary embodiments are described below.

An Item Purchaser Sends a Message

Beginning with Step 302, the System 10 receives, from a purchaser of one or more items, a first message that the item purchaser intends to be received by the recipient of one or more parcels used to transport the one or more items. The system may be configured to receive the first message in one or more suitable ways. In various embodiments, the system is configured to receive the first message by upload from a client device (e.g., a mobile device or laptop or desktop computer) to an account associated with the system (e.g., a UPS MyChoice® account). In further embodiments, the system is configured to receive the message by associating an existing message (e.g., a video posted to YouTube® or another video or photo sharing service) with an account associated with the item purchaser. In still further embodiments, the System 10 is configured to receive the first message via a social network (e.g., a video uploaded to Facebook®).

The item purchaser may be one or more entities capable of making a purchase. In various embodiments, the item purchaser is one or more individuals buying one or more items (e.g., gifts for a friend). In some embodiments, the item purchaser is one or more entities, such as a corporation, making one or more purchases. In further embodiments, the item purchaser is one or more agents making one or more purchases for another entity (e.g., an individual making a purchase on behalf of a company).

The one or more items may be any suitable items which may be purchased by the item purchaser. In various embodiments, the one or more items are gifts for the parcel recipient (e.g., the recipient of one or more parcels). In further embodiments, the one or more items are representative of a service. In a particular example, the item purchaser may purchase a gift certificate, (e.g., a certificate for $50 towards one or more products and/or services, such as a $50 Amazon® Gift Card) which may be shipped to the parcel recipient.

In various embodiments, the recipient of the one or more parcels (e.g., the parcel recipient) may be any suitable recipient. According to particular embodiments, the recipient of the one or more parcels is an individual. In various embodiments, the recipient of the one or more parcels is an entity capable of receiving one or more parcels (e.g., a corporation).

The one or more parcels may be any suitable parcel or parcels that can contain the one or more items. In various embodiments, the one or more parcels are boxes which contain the one or more items (e.g., boxes used to ship an item, such as a UPS® Express Mail Box). In a particular embodiment, the one or more parcels are other types of packaging for the one or more items, such as: soft packaging containing the one or more items (e.g., a bag containing the one or more items); one or more shipping tubes containing the one or more items (e.g., one or more document tubes); one or more crates (e.g., a wooden crate) containing the one or more items; one or more drums containing the one or more items; and/or any type of specialized shipping container containing the one or more items.

The one or more parcels may be transported to the parcel recipient in any suitable way. In a preferred embodiment, the one or more parcels are delivered to the recipient by a logistics company to the parcel recipient's home address or company address. In various embodiments, the one or more parcels are delivered to the recipient by, for example, dropping the one or more parcels off at a designated delivery location other than the recipient's home address such as a box or locker that the associated with the recipient and/or a logistics company (e.g., to be retrieved later by the parcel recipient).

The first message may be in one or more suitable forms. In various embodiments, the first message is an audio and video recording recorded by the purchaser of the one or more items. In another embodiment, the first message is only an audio recording. In still further embodiments, the first message is another type of suitable electronic message, such as text.

The first message may be any suitable message or messages. In various embodiments, the first message is a message to the parcel recipient, giving the parcel recipient information associated with the one or more purchased items (e.g., instructions how to use the one or more items from the manufacturer and/or retailer, why the item purchaser is sending the one or more items, etc.). In a particular embodiment, the first message is a message from the item purchaser to the parcel recipient regarding a special occasion of the parcel recipient, such as a birthday, anniversary, and/or any holiday (e.g., the first message is the item purchaser wishing the parcel recipient "Happy Birthday," "Merry Christmas," "Happy Chanukah," etc.).

Continuing to Step 304, the System 10 associates the first message with one or more unique identifiers associated with the one or more parcels. In various embodiments, the one or more unique identifier is any indicium (e.g., a machine-readable indicium) typically included on a shipped parcel. In a particular example, in some embodiments, the unique identifier is the barcode (e.g., a machine-readable indicium) representing an alphanumeric tracking number used by a logistics company used to track the one or more parcels. The machine-readable indicium may be a standard linear barcode, a matrix barcode, or any other structure that allows a package to be identified by machines. However, in other embodiments, the unique identifier may be a separate identifier used primarily to associate the one or more items with the first message (e.g., a unique identifier that is not used to track the one or more parcels, but associates the first message with the parcel).

The first message may be associated with the one or more unique identifiers by any suitable entity. In a particular embodiment, the first message is associated with the one or more unique identifiers by the retailer where the item purchaser purchased the one or more items. In a particular example, the item purchaser purchases a gift (e.g., one or more items and/or services) for a friend (e.g., the parcel recipient) from an online retailer (e.g., Amazon®). In a particular embodiment, while going through the checkout process on the online retailer's website, the item purchaser is given the option to record the first message for the intended recipient of the gift. In this example, in response to the item purchaser purchasing the gift, the online retailer packages the gift (e.g., in one or more parcels) and contacts a logistics company to ship the gift directly to the parcel recipient (e.g., without the item purchaser ever physically coming into contact with the gift or the parcel used to ship the gift). In a particular embodiment, the parcel used by the logistics company to ship the gift includes a barcode (or another unique identifier) that is used to track the gift through the shipping process. The online retailer may, in various embodiments, associate the first message recorded by the item purchaser with the barcode (e.g., the one or more unique identifiers) associated with the parcel containing the gift intended for the parcel recipient and save the associated first message in barcode in a database to be accessed by the parcel recipient.

According to various embodiments, the first message is associated with the one or more unique identifiers by the purchaser of the one or more items. In this example, the item purchaser purchases one or more items (e.g., a gift) for a friend from an online retailer (e.g., Amazon®) and, during the checkout process, chooses to have the gift shipped to their home address (e.g., the home address of the item purchaser). In various embodiments, the item purchaser, once the gift arrives, re-packages the gift in a parcel (or re-uses the same parcel as was used to ship the gift to the item purchaser) and chooses a logistics company to ship the parcel. In a particular embodiment, the parcel used by the item purchaser to ship the gift to the parcel recipient includes a unique identifier (e.g., a barcode). The item purchaser, in this example, accesses the logistics company's website (and/or mobile application) and records the first message for the parcel recipient (e.g., a video message for the parcel recipient saying "happy birthday") on a client device. The item purchaser uses the logistics company's website (and/or mobile application) to associate the first message with the unique identifier on the parcel used to ship the gift to the parcel recipient by scanning the unique identifier with the client device (e.g., the logistics company's website and/or mobile application receives both the first message and the unique identifier and associates the first message with the unique identifier in memory).

In various embodiments, the item purchaser uses a mobile device to scan the unique identifier to instruct the System 10 to associate the first message with the one or more items. In a particular embodiment, the item purchaser enters the unique identifier into an electronic form (e.g., on a website) associated with the System 10 to instruct the System 10 to associate the first message with the one or more items. In further embodiments, the item purchaser sends an electronic message (e.g., SMS message and/or email) that includes the first message and the unique identifier to instruct the System 10 to associate the first message with the unique identifier. In various embodiments, the one or more unique identifiers are associated with the one or more parcels by being placed in a card or other item that is included with the parcels (e.g., the one or more unique identifiers are printed on a card intended for the recipient of the one or more items).

At Step 306, the system, at least partially in response to the parcel recipient receiving the one or more parcels, receives, from the parcel recipient, a request to receive the first message at least partially based on the unique identifier. The system may be configured to receive the request to receive the first message in any suitable way, from one or more suitable mechanisms. In various embodiments, the system is configured to receive the request to receive the first message from a client device (e.g., the one or more Devices 12, 14, and/or 16) associated with the item purchaser. In particular embodiments, the system is configured to receive the request to receive the first message via a website, a third-party server (e.g., the one or more Third Party Servers 35), and/or via an electronic message such an email, SMS message, and/or a message on a social network.

In various embodiments, the parcel recipient may send the unique identifier to the system in any suitable way. In a particular embodiment, the parcel recipient may send the unique identifier to the system via an email, a SMS message, and/or a message on a social network. In further embodiments, the parcel recipient types (e.g., on an alphanumeric or touch-screen keyboard) the unique identifier into a mobile application or website on a client device to send the unique identifier to the system.

According to a preferred embodiment, the parcel recipient scans the unique identifier on the parcel containing the one or more items (e.g., the unique identifier is embodied as a machine-readable indicium on the parcel) with a client device. In various embodiments, the request is initiated by scanning the unique identifier with a device capable of electronically reading the identifier. In a particular example, the unique identifier may be a barcode or any other machine-readable indicium used by a logistics company to track the gift and the parcel recipient may use a suitable mobile device to read the barcode (e.g., by scanning the barcode). In this example, the mobile device requests access to the first message by (or after) scanning the unique identifier.

The request from the parcel recipient to receive the first message at least partially based on the unique identifier may include any suitable information. In various embodiments, the request to receive the first message includes the unique identifier (e.g., only the unique identifier). According to a particular embodiment, the request to receive the first message includes the unique identifier and information associated with account information associated with the parcel recipient (e.g., an account associated with the logistics company and/or retailer associated with the one or more parcels and/or the one or more items). In this example, the parcel recipient scans the unique identifier associated with the first message on a client device associated with the parcel recipient. Continuing with this example, the client device is configured to send account information associated with the parcel recipient and at least a portion of the scanned unique identifier to the system. The system then, in various embodiments, at least partially in response to receiving the unique identifier and the account information associated with the parcel recipient accesses and sends the first message to the client device associated with the parcel recipient.

At Step 308, the System 10, in response to receiving the request from the parcel recipient, facilitates the parcel recipient receiving the first message. In various embodiments, the parcel recipient receives the first message via an email. In further embodiments, the parcel recipient receives the first message via a social network (e.g., Facebook®). In still further embodiments, the parcel recipient receives the first message by logging into an account associated with a web service (e.g., UPS MyChoice®). In a particular embodiment, as in the example at Step 306, the parcel recipient's mobile device is capable of accessing the first message in a single step by the parcel recipient (e.g., by scanning the unique identifier, logging into a suitable on-line account, and playing the first message).

A Parcel Recipient Sends a Message

Continuing with FIG. 3, at Step 310, the system receives, from the parcel recipient, a second message that is related to the one or more parcels. The system may be configured to receive, in various embodiments, the second message in any of the ways (or other ways) that the System 10 receives the first message described in Step 302.

In various embodiments, the System 10 is configured to receive the second message at least partially in response to the parcel recipient receiving the gift. According to particular embodiments, the parcel recipient receives a notification that there is a message (e.g., the second message) associated with the parcel before receiving the parcel. In this example, the system is configured to receive the second message before the parcel recipient receives the gift (e.g., the parcel).

The system may be configured to receive the second message in one or more suitable forms. In various embodiments, the second message is a video message. According to a particular embodiment, the second message is an audio message, a text-based message, and/or a combination audio and text-based message. In further embodiments, the second message is any combination of audio, visual, and/or text messages.

The second message may be intended for any suitable entity. According to one embodiment, the second message is intended to be a message for the sender of the parcel, which may or may not be the item purchaser (e.g., as described in Step 304, where the sender is actually the online retailer). In various embodiments, the second message is intended for the item purchaser (e.g., a "thank you" message for the gift). In other embodiments, the second message is intended for the online retailer. In this particular example, the second message is to show the online retailer the condition of the purchased items and/or the condition of the packaging (e.g., if the one or more items shipped to the parcel recipient are damaged and/or incorrect items, etc.)

At Step 312, the system associates the second message with the one or more parcels. In various embodiments, the system is configured to associate the second message with the one or more parcels in any of the ways (or other ways) the system is configured to associate the first message with the one or more parcels in Step 304.

At Step 314, the System 10 receives, from the item purchaser, a request to receive the second message, wherein the request is at least partially based on the unique identifier. In various embodiments, the item purchaser makes a request to receive the second message by entering the unique identifier into a suitable webpage and/or selects a suitable link within the message informing them of the existence of the second message. In a particular embodiment, the item purchaser makes a request to receive the second message by scanning the unique identifier with a client device. In this example, the client device then requests the second message associated with the scanned unique identifier. The system may also, in still further embodiments, transmit a suitable message to the item purchaser (e.g., via an e-mail, SMS message, or a post on a social networking site) alerting the item purchaser of the second message.

At Step 316, the System 10, at least partially in response to receiving the request from the item purchaser to receive the second message, facilitates the item purchaser receiving the second message. The system may, in particular embodiments, be configured to facilitate the item purchaser receiving the second message in any of the ways (or other ways) the system is configured to facilitate the parcel recipient receiving the first message in Step 308.

ALTERNATE EMBODIMENTS

Alternative embodiments of the system may comprise features that are, in some respects, similar to the various components described above. Selected distinguishing features of these alternative embodiments are discussed below.

The Parcel Recipient Receives the Item Purchaser's Message Before Receiving the Associated Parcel While some embodiments described above describe having the recipient of a parcel receive the message sender's message after receiving the parcel, in various embodiments, the system may, in various embodiments, be adapted to allow the parcel recipient to receive the sender's message before receiving the parcel. In a particular example, the system may be configured to send a notification (e.g., an electronic message) to the parcel recipient notifying the parcel recipient of the first message. The notification may be any suitable notification, including (but not limited to): a SMS message; a message on a social network; an email; a pop-up style message; a notification message from a mobile device application (e.g., a notification on a mobile device); and/or a message associated with a logistics server. The parcel recipient may access the first message and, in some embodiments, record the second message before receiving the one or more parcels.

The System May Send a Notification Message to the Message Sender

In some embodiments, the system may be adapted to allow the parcel recipient to send a notification to the item purchaser confirming receipt of the first message, without including a recorded message (e.g., via an email read-receipt). The receipt confirmation may be in any suitable form, such an email, an SMS message, a message on a website, a pop-up style window, and/or a message on a social network.

The Message System May Function in One Direction

In various embodiments, the system may be adapted to allow the item purchaser to send a message to the parcel recipient without providing an opportunity for the parcel recipient to send a message in return or vice-versa. In a particular example, in some embodiments, the system may be configured to enable parcel recipient to associate a message (e.g., the second message above) with the one or more parcels without having received a message from the item purchaser (e.g., the first message).

The Messages May be Associated with the One or More Parcels in any Suitable Way

According to a particular embodiment, the system is configured to associate the first message and/or the second message with the one or more parcels in any suitable way, including those not discussed above. In a particular example, the system is configured to associate the first and/or second message with the one or more parcels via a password (e.g., a password is sent to the item purchaser and/or the parcel recipient). In this example, the item purchaser and/or parcel recipient accesses the first and/or second message by sending the password to the system (in any suitable way). Continuing with this example, the system is configured to receive the password and access a database where the first and/or second messages are associated with the password.

The Messages May be from any Sender

In various embodiments, the first message may not be from the item purchaser. In a particular embodiment, the first message is from the online retailer where the one or more items were purchased by the item purchaser (e.g., a message from the retailer related to the one or more items, such as an advertisement for accessories of the one or more times, etc.). In further embodiments, the first message is from a logistics company offering a discount on further shipping. In still further embodiments, the first message is from the manufacturer of the one or more items. In this example, the first message from the manufacturer of the one or more items may be any suitable message, including an advertisement, an offer for a discount, instructions for the one or items, and/or warranty and return information for the one or more items.

The Message Module May be Executed by One or More Appropriate Entities

In various embodiments, any of the processes described herein may be executed entirely by a logistics company (e.g., using logistics servers). In particular embodiments, the logistics company may complete the processes without the involvement of a retailer. In further embodiments, the processes described herein may be executed entirely by an online retailer. In still further embodiments, the processes described herein may be executed by a combination of logistics servers, retailer servers, and/or social network servers.

There May be any Number of Appropriate Messages Associated with the Unique Identifier In various embodiments, the item purchaser records one or more messages for the parcel recipient. In a particular embodiment, the parcel recipient records one or more messages for the item purchaser. In further embodiments, the item purchaser and the parcel recipient record any suitable number of messages that are associated with the unique identifier. In a particular example, the item purchaser records a first message for the parcel recipient (as described above), which is associated with a unique identifier. In response, in this example, the parcel recipient records a second message for the item purchaser, which is associated with the unique identifier (as described above). Additionally, continuing with this example, in response to the parcel recipient sending the second message to the item purchaser, the item purchaser may, in a particular embodiment, record a third message associated with the unique identifier intended for the parcel recipient. In still further embodiments, at least partially in response to receiving the third message, the parcel recipient may record a fourth message for the item purchaser.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

We claim:

1. A computer system for associating a message with a parcel used to transport a gift to a gift recipient, the computer system comprising:

a memory device storing computer-readable program code; and at least one processor in communication with the memory device, the processor being operative with the computer-readable program code to:

receive, at a logistics server, a request to login to a logistics account of a gift purchaser as part of a checkout procedure of an online retailer server for purchasing a gift, wherein a website page of the online retailer includes the checkout procedure and is integrated with operations of the logistics server that receives the request, and wherein the logistics server is a computing device of a shipping company that is to physically deliver the parcel to the gift recipient, and wherein the retailer server is a third computing device of the online retailer, the shipping company and the online retailer being different entities;

in response to the receiving of the request to login to the logistics account, capture, by the logistics server, a first message at the logistics account, the first message was input at a first computing device associated with the gift purchaser, wherein the capturing is a part of the checkout procedure associated with the online retailer server;

based at least in part on the capturing of the first message, associate the first message with the purchasing of the gift, wherein the parcel is used to transport the gift to the gift recipient, and wherein the associating of the first message is a part of the checkout procedure associated with the online retailer;

subsequent to the capturing of the first message, receive, from a second computing device of the gift recipient, an indication that the second computing device has performed a machine-read of a tracking number located on the parcel, the indication is indicative of a second request to receive the first message;

based on the machine-read of the tracking number, cause an application stored on the second computing device to retrieve the first message, enable the gift recipient to receive the first message at the second computing device and use the tracking number to also track the parcel across one or more geolocations, wherein the tracking number is a package identifier that allows the parcel holding the gift to be identified as the parcel traverses the one or more geolocations and also allows messages to be retrieved;

receive, from the second computing device, a second message of the gift recipient;

use the tracking number located on the parcel, associate, in computer memory, the second message with the parcel;

receive a third request from the gift purchaser to receive the second message based on the gift purchaser inputting the tracking number at the first computing device; and in response to the receiving of the third request and based on another machine read of the tracking number, enable the gift purchaser to receive the second message.

2. The computer system of claim 1, wherein the processor is operative to enable the gift recipient to receive the first message after receiving login information from the second computing device associated with the gift recipient, the login information being associated with an account associated with the gift recipient.

3. The computer system of claim 2, wherein the second computing device associated with the gift recipient is configured to access the account associated with the gift recipient.

4. The computer system of claim 2, wherein the processor is operative to receive the first message from the gift purchaser by receiving information from the gift purchaser that enables the system to associate the first message with the account associated with the gift recipient.

5. The computer system of claim 4, wherein the account associated with the gift recipient is associated with the shipping company.

6. The computer system of claim 1, wherein the second message is a video message.

7. The computer system of claim 1, wherein the second message is a video message from the gift recipient thanking the gift purchaser.

8. A computer system for associating a message with a parcel used to transport a gift to a parcel recipient, the computer system comprising a memory device storing computer-readable program code; and at least one processor in communication with the memory device, the processor being operative with the computer-readable program code to:

receive, at a logistics server, a request to login to a logistics account of a gift purchaser as part of a checkout procedure of an online retailer server for purchasing a gift, the logistics server is a computing device of a first entity responsible for shipping a parcel, the online retailer server is a third computing device of second entity that is different than the first entity, wherein a website page of the online retailer server includes the checkout procedure and is integrated with operations of the logistics server that receives the request;

in response to the receiving of the request to login to the logistics account, capturing, by the logistics server a first message at the logistics account, wherein the first message is input at a first computing device associated with the gift purchaser, and wherein the input is a part of the checkout procedure associated with the online retailer server;

based at least in part on the capturing of the first message, associate the first message with the purchasing of the gift, wherein the associating of the first message is a part of the checkout procedure associated with the online retailer;

in response to the capturing of the first message, receive a tracking number;

in response to receiving the tracking number, use the tracking number to enable a second computing device of the parcel recipient to access the first message based on a machine read, by the second computing device, of the tracking number, and use the tracking number to track the gift as the gift is transported to the parcel recipient in response to the receiving of the tracking number;

subsequent to the enabling of the second computing device to access the first message, receive, by the second computing device, a second request to upload a second message to the logistics server based on the parcel recipient inputting the tracking number at the second computing device;

in response to the receiving of the second request and based on another machine read of the tracking number, receive, from the second computing device of the parcel recipient, a video of the gift within the parcel that encloses the gift indicative of the gift being damaged;

receive a third request from the gift purchaser to receive the second message based on the gift purchaser inputting the tracking number at the first computing device; and in response to the receiving of the third request and based on another machine read of the tracking number, enable the gift purchaser to receive the second message.

9. The computer system of claim 8, wherein indicum that represents the tracking number includes at least a portion of a barcode on a shipping label affixed to the parcel that is used to transport the gift.

10. The computer system of claim 8, wherein the computer system is part of a logistics system used to transport the parcel to the parcel recipient.

11. The computer system of claim 8, wherein the processor is further operative to receive the first message from the gift purchaser by:

receiving, account information associated with the gift purchaser;

logging the gift purchaser into an account associated with the system at least partially based on the received account information;

capturing the first message;

storing the first message in memory; and associating the first message with the account of the gift purchaser.

12. The computer system of claim 8, wherein the processor is further operative to notify the gift purchaser, after the video or image is associated with the parcel, that the parcel recipient sent the video or image.

* * * * *